US008370466B2

(12) United States Patent  
Verma et al.

(10) Patent No.: US 8,370,466 B2  
(45) Date of Patent: Feb. 5, 2013

(54) METHOD AND SYSTEM FOR PROVIDING OPERATOR GUIDANCE IN NETWORK AND SYSTEMS MANAGEMENT

(75) Inventors: Dinesh Verma, Mount Kisco, NY (US); Graham Anthony Bent, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 12/177,973

(22) Filed: Jul. 23, 2008

(65) Prior Publication Data

US 2010/0023604 A1  Jan. 28, 2010

(51) Int. Cl.  
G06F 15/177 (2006.01)  
G06F 15/173 (2006.01)

(52) U.S. Cl. ........................................ 709/221; 709/224

(58) Field of Classification Search .................... 709/221  
See application file for complete search history.

(56) References Cited

U.S. PATENT DOCUMENTS

| | | | |
|---|---|---|---|
| 5,815,395 A * | 9/1998 | Hart et al. ...................... 700/110 |
| 2003/0093709 A1* | 5/2003 | Ogawa et al. ...................... 714/4 |
| 2006/0031435 A1* | 2/2006 | Tindal ............................. 709/220 |
| 2006/0242288 A1* | 10/2006 | Masurkar ........................ 709/223 |
| 2007/0092282 A1* | 4/2007 | Takenoshita ..................... 399/81 |
| 2007/0109580 A1* | 5/2007 | Yoshida .......................... 358/1.13 |
| 2008/0016465 A1* | 1/2008 | Foxenland ...................... 715/828 |
| 2008/0244693 A1* | 10/2008 | Chang ............................... 726/1 |
| 2008/0250042 A1* | 10/2008 | Mopur et al. .................. 707/100 |
| 2008/0282336 A1* | 11/2008 | Diaz Cuellar et al. ........... 726/11 |
| 2008/0301765 A1* | 12/2008 | Nicol et al. ........................ 726/1 |
| 2009/0158096 A1* | 6/2009 | Ali et al. .......................... 714/43 |

* cited by examiner

Primary Examiner — Patrice Winder  
Assistant Examiner — Ebrahim Golabbakhsh  
(74) Attorney, Agent, or Firm — Tutunjian & Bitetto, P.C.; Preston Young

(57) ABSTRACT

An operator guidance system is provided for an administrator managing a computer network such as a distributed computer system. Fault events reported by a fault management system in the network are enhanced to include topology information about other nodes (such as neighbor nodes, path nodes and/or service nodes) that may have been responsible for the fault. The enhanced events are correlated with configuration commands used in the past to correct faults. A set of guidance rules are developed based on the actions that were taken by the operator in handling previous faults of a similar nature. The guidance rules can be displayed to the administrator to facilitate network fault resolution. Using a set of predefined policies, some of the corrective actions can be performed automatically.

19 Claims, 11 Drawing Sheets

METHOD AND SYSTEM FOR PROVIDING OPERATOR GUIDANCE IN NETWORK AND SYSTEMS MANAGEMENT

This invention was made with Government support under Contract W911NF-06-3-0001 awarded by the U.S. Army. The Government has certain rights in this invention.

FIELD OF THE INVENTION

The present invention generally relates to information technology, and, more particularly, to the field of network and systems management.

BACKGROUND

During the operation of most computer networks and distributed systems, several faults and failures inevitably arise. In some cases, the faults and failures are transient and can be corrected automatically by the network or distributed system. However, in many cases, a human administrator must intervene to understand the cause of the fault or failure, and then undertake corrective action. Often, the corrective action involves changing the configuration of system devices and components.

Current systems that report network faults are distinct and isolated from systems used to make configuration changes. The human administrator(s) typically monitor network faults from a network management system and after determining the root-cause, a separate configuration system is used to fix the problem.

Thus, a need exists for improved network management and configuration systems.

BRIEF SUMMARY

One embodiment of the present invention provides an automated means to link together network configuration systems and fault monitoring systems to leverage the individual strengths of the systems. Embodiments of the present invention include methods and systems for managing a network by retrieving network fault event information for a target node and enhancing the network fault event information with certain network topology information. The enhanced network fault event information can incorporate network topology information such as: information on path nodes in a routing path of one or more nodes identified in the network fault event; information on one or more adjacent nodes to one or more nodes identified in the network fault event; and/or information on one or more nodes that perform a service function for one or more nodes identified in the network fault event. Past network configuration change information is then retrieved based on the enhanced network fault event information; and the enhanced network fault event information is then correlated with the past network configuration change information for the target node. In one example, the correlated past network configuration change information is used to reconfigure a network node to correct a network fault.

Another aspect of the present invention captures the human intelligence involved in solving past network problems and applies it to automatically resolve future problems by building a knowledge base that can assist operators (in some cases automatically without operator involvement) to address subsequent faults. For example, in some embodiments, a set of network operation guidance rules based on correlated past network configuration change information are created and stored. The set of network operation guidance rules may be ordered based on a frequency of occurrence of the correlated past network configuration change information. In some embodiments, network reconfiguration recommendations are made to a network administrator, or a network node may be automatically reconfigured, based on the stored set of network operation guidance rules.

BRIEF DESCRIPTION OF THE DRAWINGS

These and other objects, features and advantages of the present invention will become apparent from the following detailed description of illustrative embodiments thereof, which are to be read in connection with the accompanying drawings, in which.

DETAILED DESCRIPTION

As discussed above, current computer networks infrastructures for fault management and the network configurations are distinct and not integrated. One embodiment of the present invention provides an automated means to link together configuration systems and the fault monitoring system and leverage the individual strengths of the systems to significantly reduce the workload on the network administrator. For example, in one embodiment, a fault generated by one node of a network management system can be automatically correlated with a second node that must be reconfigured to correct the fault and which (second node) is described only in a separate configuration management system of the same network.

Another aspect of the present invention captures the human intelligence involved in solving past network problems and applies it to automatically resolve future problems. For example, the present invention includes features for correlating information contained in a network fault management systems of an enterprise with information contained in a configuration management system of that enterprise. The correlated information can be used to build a knowledge base that can assist operators (in some cases automatically without operator involvement) to address subsequent faults. For example, by learning the correlation between a configuration action and a network fault, some embodiments of the present invention may deploy policies which could cause an automated program to take corrective action when a fault for which a learned configuration change solution is encountered in the system.

In some embodiments of the invention, graph-theoretical techniques are used to determine relationships between the different components of the network, both for fault reporting and for configuration management, and the relationships can be used to determine which configuration actions are recommended to remedy a reported fault. This information can also be summarized and used to guide an operator when similar faults occur in the future.

Figure 1:
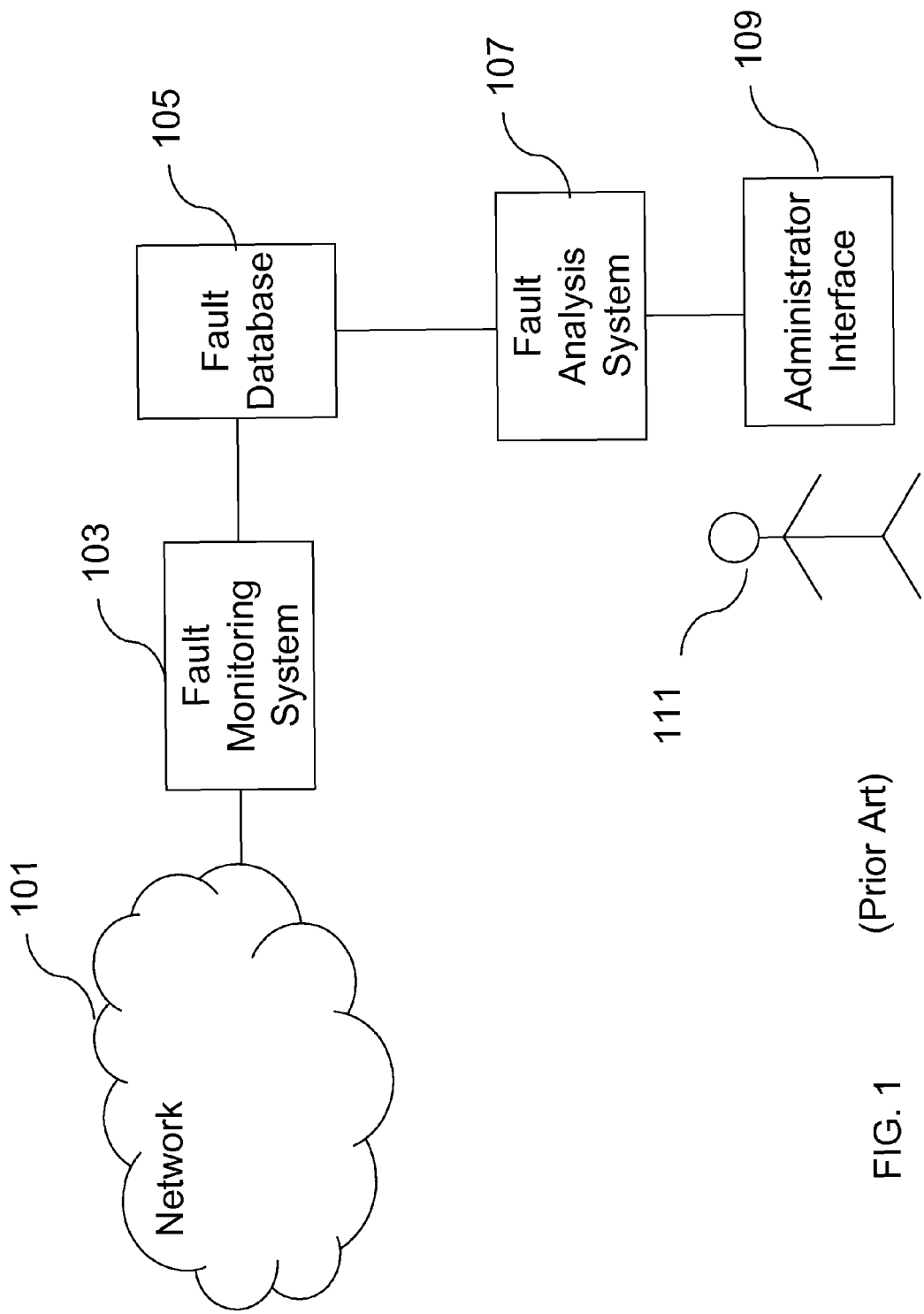
FIG. 1 is a block diagram illustrating an infrastructure for managing computer network faults.

Referring now to the Figures, an example of a current infrastructure for managing computer network faults is depicted in FIG. 1. The Network 101 represents a network managed by the use of a Fault Monitoring System (FMS) 103. The Network 101 includes a plurality of different computers that are interconnected and operate together to provide the functionality required of the Network 101 e.g., a distributed computing platform. The FMS 103 collects fault information, for example by actively polling network elements/nodes or by listening passively to alerts and fault indication messages coming from Network 101 nodes managed by the FMS 103. The Fault Monitoring System 103 stores fault event information into Fault Database (FD) 105. A Fault Analysis System (FAS) 107 is used to analyze the alert/fault information, based on schemes and algorithms that perform root cause analysis for diagnosing the root cause of the failure. The results of the root cause analysis are accessible to an administrator 111 through Interface 109.

An example of such a Fault Monitoring System is that sold by International Business Machines Corporation under the trademark IBM TIVOLI NETCOOL OMNIBUS. The FMS 103 may periodically ping and check connectivity among different servers in the Network 101. Such probe based monitoring is well known and an example of such a probe that is sold by International Business Machines Corporation under the trademark IBM TIVOLI NETCOOL OMNIBUS IP PROBE. In this example, assume that FMS 103 is running on server S4, and is monitoring (by pinging) the liveliness of the other servers.

An example of a Fault Database 105 is a component of the product sold by International Business Machines Corporation under the trademark TIVOLI NETCOOL OMNIBUS, wherein a hypothetical and simplified set of fault events may be represented as follows:

| TimeStamp | Reporting Node | Fault Node | Error Code |
|---|---|---|---|
| 100 | S4 | S1 | Unreachable |
| 200 | S4 | S1 | Normal |
| 300 | S4 | S3 | Unreachable |
| 400 | S4 | S3 | Normal |
| 500 | S4 | S1 | Unreachable |
| 600 | S4 | S1 | Normal |
| 700 | S4 | S2 | Unreachable |
| 800 | S4 | S2 | Normal |

Based on the root cause analysis, the administrator can take corrective action, which usually requires making configuration changes in the Network 101 as will be described in more detail with reference to FIG. 2.

Those skilled in the art will appreciate that the scheme of FIG. 1 can be adapted for managing enterprise networks, distributed computer systems, or multi-node applications operated within a data center, where the Network 101 represents the enterprise networks, distributed computing systems, or data center applications being managed.

Figure 2:
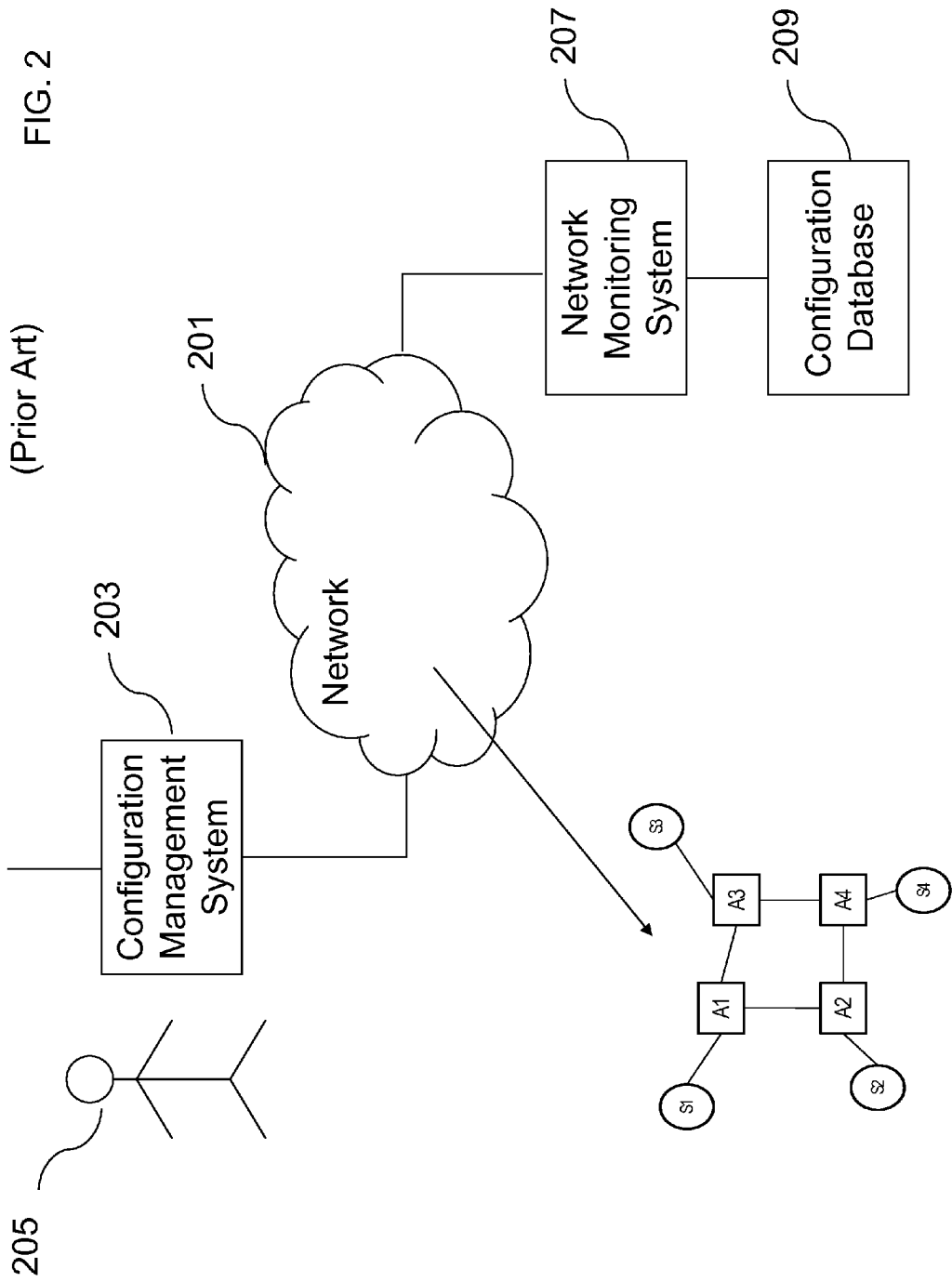
FIG. 2 is a block diagram illustrating an infrastructure used for managing configuration changes in a computer network.

FIG. 2 depicts an example of a typical configuration management infrastructure. As depicted, a Configuration Management System (CMS) 203 can be used by an administrator/operator 205 to change the configuration of one or more nodes in the Network 201. By way of example only, the Network 203 could comprise, for example, a distributed computing environment (not shown). The Configuration Management System 203 may include its own user-interface, and provide features such as: to enable configuration commands to be repeated across multiple nodes of Network 203; validation of command syntax and scope; and a determination of a correct implementation sequence of multiple configuration commands e.g., if of two patches need to be applied to a server, the CMS 203 could determine the order in which to apply the patches. In some environments, the CMS 203 is coupled to a Configuration Management Database (CMDB) 209, which stores the current configuration of the elements/nodes in the distributed computing environment of the Network 201 and a history of configuration changes made to the Network 203. The Network Monitoring System (NMS) 207 monitors the configuration of the Network 203 and populates and managed the CMDB 209. The system administrator/operator 205 can query the CMDB 209 to verify and validate the current configuration of the Network 201, or run various types of other queries on a network node's configuration. By way of example only, a simple network topology is depicted in FIG. 2 by servers S1 . . . S4 and devices A1 . . . A4. Current technologies in network management for topology monitoring typically rely on the ability of the NMS to query every node in the network to discover network links and determine current states of the network links. For example, NMS 207 could discover the topology of the network by a BFS (Breadth First Search) process, i.e., iterating the process of querying a node's adjacency table that lists its neighbors and visiting its neighbors until no more new nodes (or links) can be discovered. An example of a product for discovering and the managing the network topology is a network discovery product sold by International Business Machines Corporation under trademark TIVOLI NETCOOL ITNM. One possible database representation of the topology lists the adjacent nodes and the list of devices and their network configuration parameters. A simplified version such a topology could be represented in Configuration Database 209, as follows:

| Link Number | First Node | Second Node |
|---|---|---|
| 1 | S1 | A1 |
| 1 | S2 | A2 |
| 3 | S3 | A3 |
| 4 | S4 | A4 |
| 5 | A1 | A2 |
| 6 | A1 | A3 |
| 7 | A2 | A4 |
| 8 | A3 | A4 |

An example of a current configuration management system is that sold by International Business Machines Corporation under the trademark TIVOLI PROVISIONING MANAGER. The CMS 203 can enable different types of configuration changes to be made to the Network 201. The NMS 207 identifies and records the changes CMDB 209. A simplified example record of network node configuration changes may be represented as follows:

| TimeStamp | Node Reconfigured | Command |
|---|---|---|
| 150 | A1 | Reboot |
| 350 | A3 | Reboot |
| 550 | A1 | Reboot |
| 750 | A2 | Reboot |

Current Fault Management Systems (FIG. 1) and Configuration Management Systems (FIG. 2) are usually implemented on separate infrastructures and using different products. Thus, an administrator that typically determines a root cause using Fault Management System (FIG. 1) must then performs any required reconfiguration to correct the fault by using the separate Configuration Management System (FIG. 2). It can also be seen that the available fault event information and configuration change information in the above sample tables do not provide sufficient information to enable any machine processing system to establish a relationship between the fault events stored in the FD 305 and the configuration changes stored in the CMDB 209.

As will be described in more detail below, the present invention includes features that advantageously enhances, correlates and leverages the information and functionality of the heretofore uncoordinated Configuration Management System (FIG. 1) and Fault Management System (FIG. 2). For example, embodiments of the present invention include features that can both reduce the time required of a human administrator to address network faults while increasing the accuracy of corrective actions taken to address network faults.

Figure 3:
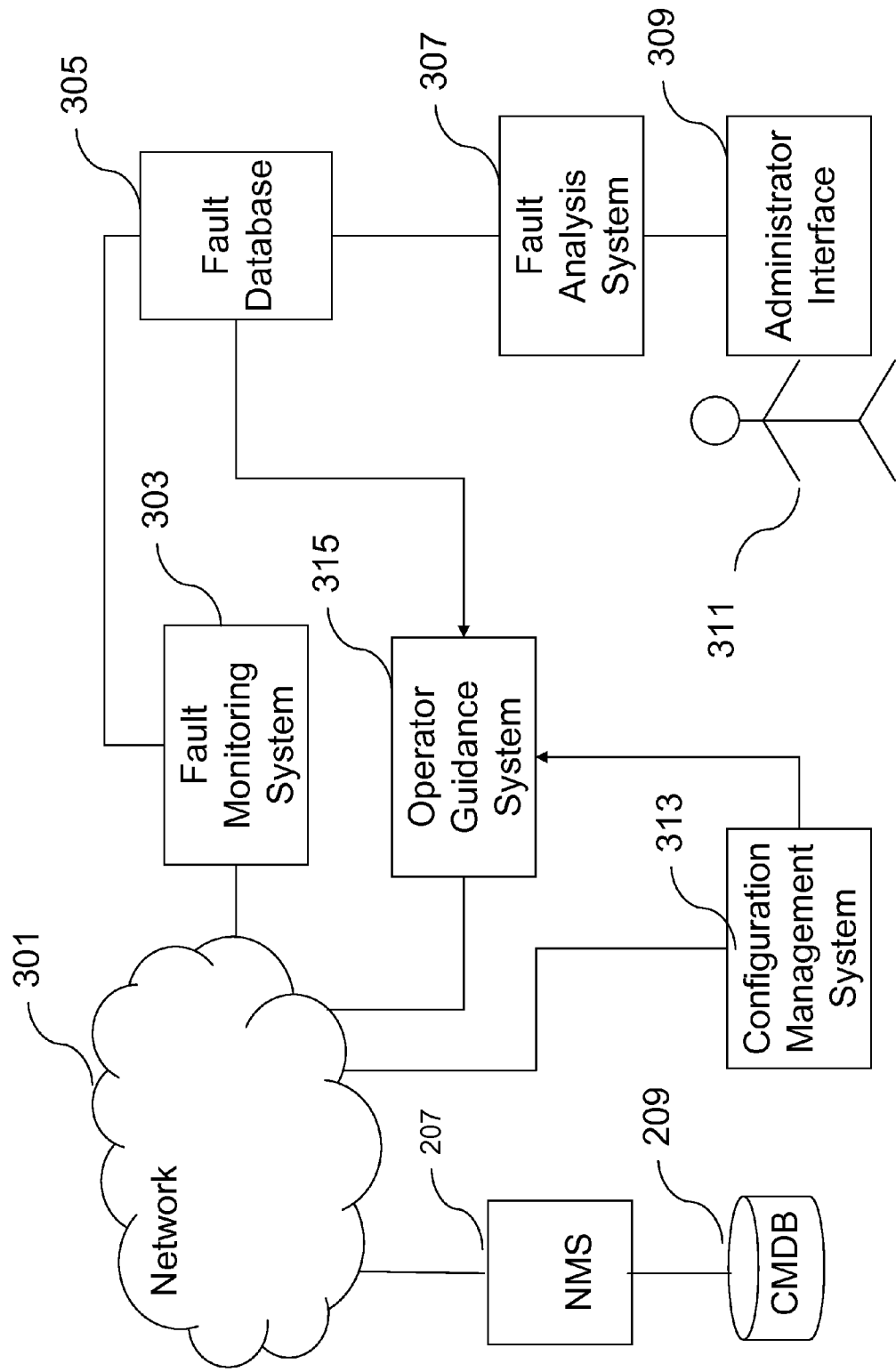
FIG. 3 is a block diagram illustrating an infrastructure for providing operator guidance in accordance with an embodiment of this invention.

FIG. 3 depicts an example of an infrastructure for providing operator guidance in a computer network or a distributed computer system in accordance with the present invention. As depicted, a network or a distributed computer system 301 includes a plurality of nodes, managed by Fault Management System (FMS) 303. The Fault Management System 303 collects network health information, e.g., by actively polling the network elements or via listening passively for network alerts and fault indication messages coming from the nodes in the Network 301. The FMS 303 stores selected fault information into Fault Database 305. A Fault Analysis System 307 analyzes the fault information, using schemes and algorithms to perform root cause analysis to diagnose the event that is the root cause of the failure. The results of the root cause analysis are made accessible to an administrator/operator 311 through an interface 309. The administrator uses the results of the root cause analysis to take corrective action, which may require making configuration changes to the Network 301. These configuration changes are made using a Configuration Management System (CMS) 313. An Operator Guidance System (OGS) 315 in accordance with one embodiment of the present invention, leverages information from the Fault Database 305 and the Configuration Management System 313 to enhance and correlate the fault and configuration information to create rules and a guidance mechanism that enable more efficiently management of Network 301.

Figure 4:
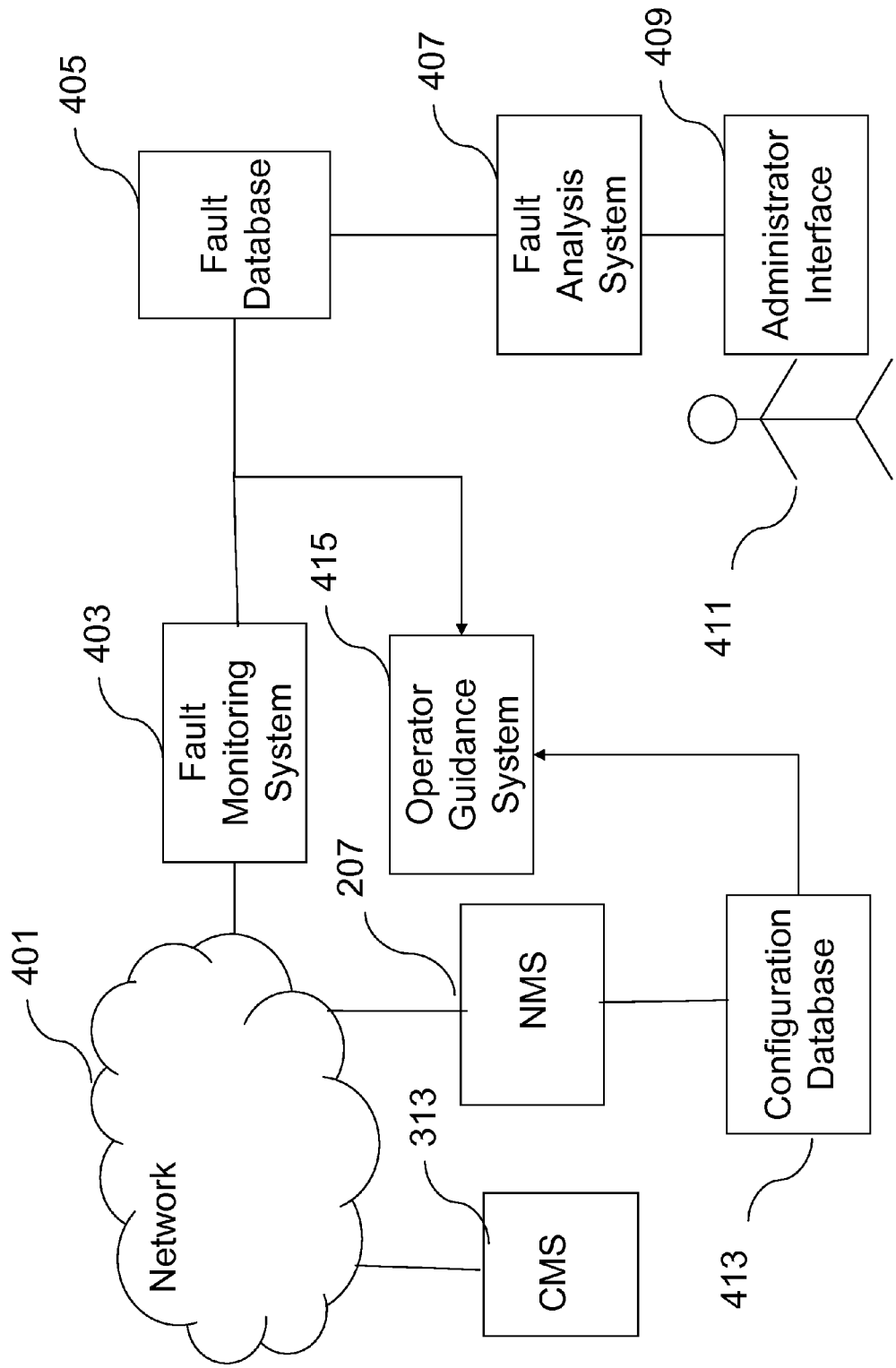
FIG. 4 is a block diagram illustrating an infrastructure that can be used for providing operator guidance in accordance with another embodiment of this invention.

Those skilled in the art will appreciate that the Operator Guidance System 315 can be implemented in various ways to provide guidance and suggestions on how to handle subsequent faults occurring in the Network 301. For example, referring now to an embodiment depicted in FIG. 4, the Operator Guidance System (OGS) 415 can be linked directly to a Configuration Management Database 413 which records the configuration of various components/nodes of, for example, a distributed computer system in Network 401. Those skilled in the art will also appreciate that OGS 315, 415 could alternatively communicate with the or more of the FMS 303, 403, CMS and/or databases CMDB 209 and FD 305, through the Network 301. Referring again to FIG. 4, the fault information is monitored and collected by Fault Monitoring System (FMS) 403 e.g., through active polling the Network 401 nodes or by listening passively to alerts and fault indication messages coming from the nodes in the Network 401. The FMS 403 stores fault information into Fault Database 405. A Fault Analysis System 407 analyzes the fault information, using schemes and algorithms to perform root cause analysis diagnosing the event that is the root cause of the failure. The results of the root cause analysis are accessible to an administrator/operator 411 through Interface 409. Based on the results of the root cause analysis, the administrator 411 can take corrective action, which usually requires making some configuration changes in the network 401. These configuration changes are recorded in and tracked through a Configuration Management Database 413. The Configuration Management Database 413 may, for example, automatically collect configuration information at periodic intervals from the Network 401, or it may collect information based on commands issued to it by the operator 411. The Operator Guidance System 415 in this embodiment of the invention obtains information from the Fault Database 405 and the Configuration Management Database 413. The OGS 415 correlates that information to create rules and a guidance mechanism enabling better management of the network 401. The Operator Guidance System 415 can provide the guidance to the operator through its own interface (not shown) or via communication link to the Administrator interface 409 to provide guidance and suggestions on how to handle subsequent faults that originate in Network 401.

Figure 5:
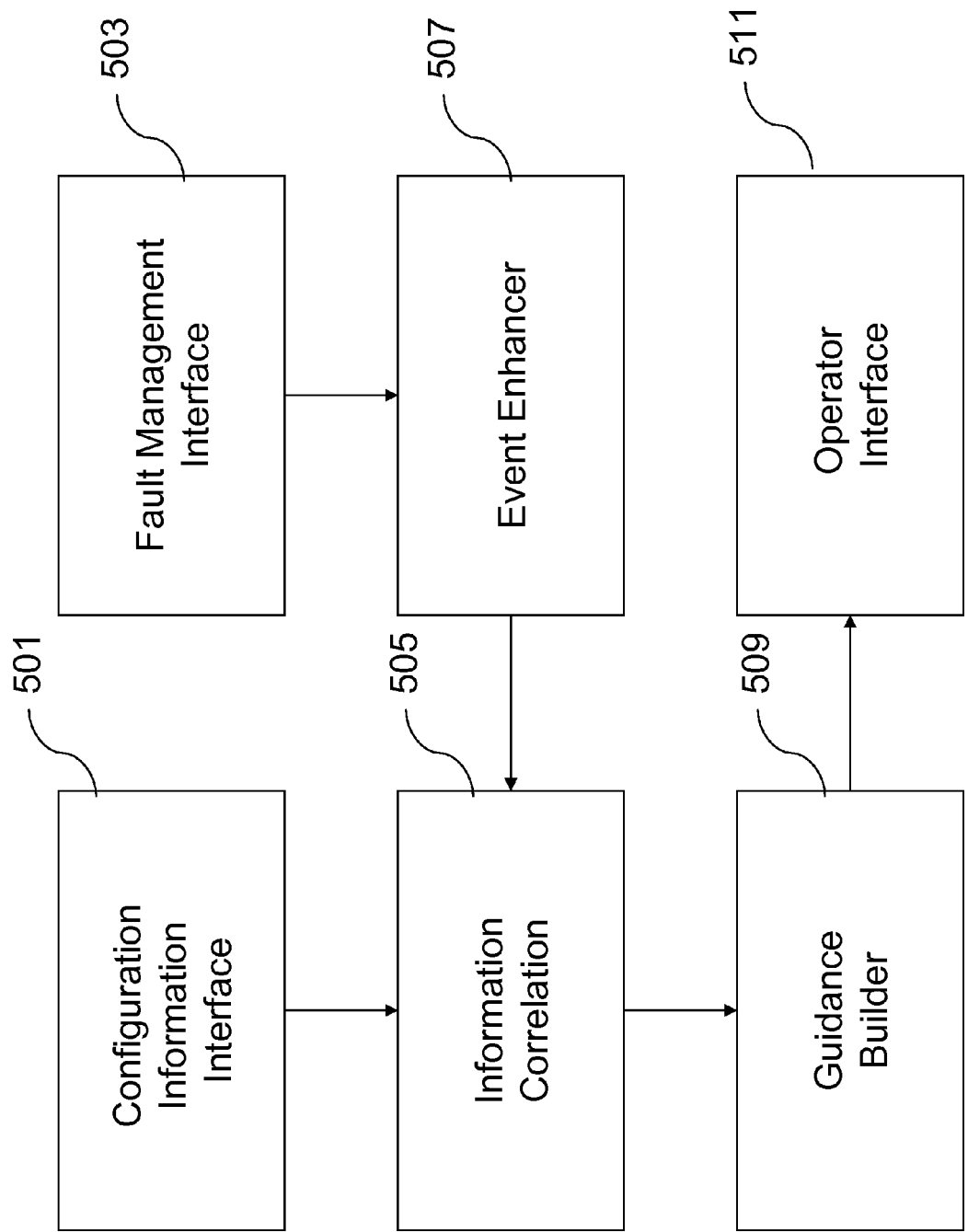
FIG. 5 is a block diagram illustrating a system in accordance with an embodiment of this invention.

FIG. 5 depicts an exemplary block diagram of an operator guidance system in accordance with the present invention. As depicted, an operator guidance system may include a Configuration Information Interface (CII) 501, a Fault Management Interface (FMI) 503, an Information Correlation Engine (ICE) 505, an Event Enhancer (EE) 507, a Guidance Builder (GB) 509 and an Operator Interface (OI) 511. In some embodiments, the CII 501 interfaces with the Configuration Management System FIG. 3, 313 or the Configuration Management Database FIG. 4, 413 to obtain a sequence of configuration commands that can be invoked by an operator to manage and correct faults that have occurred. The Fault Management Interface 503 can be used to obtain information on past faults that have occurred in the network e.g., by a connection to the Fault Database FIG. 3, 305, or FIG. 4, 405. The ICE 505 can be used to identify and learn reconfiguration patterns that have been used to manage the network in the past. However, those skilled in the art will appreciate that configuration change patterns can not be easily correlated to past fault events since, as was discussed above, current Fault Management Systems (FIG. 1) and Configuration Management Systems (FIG. 2) are implemented on separate infrastructures and using different products. In some embodiments of the present invention, network fault events collected by the Fault Management Interface 503 from the fault database are enhanced using Event Enhancer 507 to identify nodes that may require configuration changes. The outputs of the Event Enhancer 507 and the Configuration Information Interface 501 are then correlated by an Information Correlation Engine 505, which provides a basis for the guidance rules to be built by Guidance Builder 509. The guidance rules built by the Guidance Builder 509 may be displayed to an administrator/operator using the Operator Interface 511.

Figure 6:
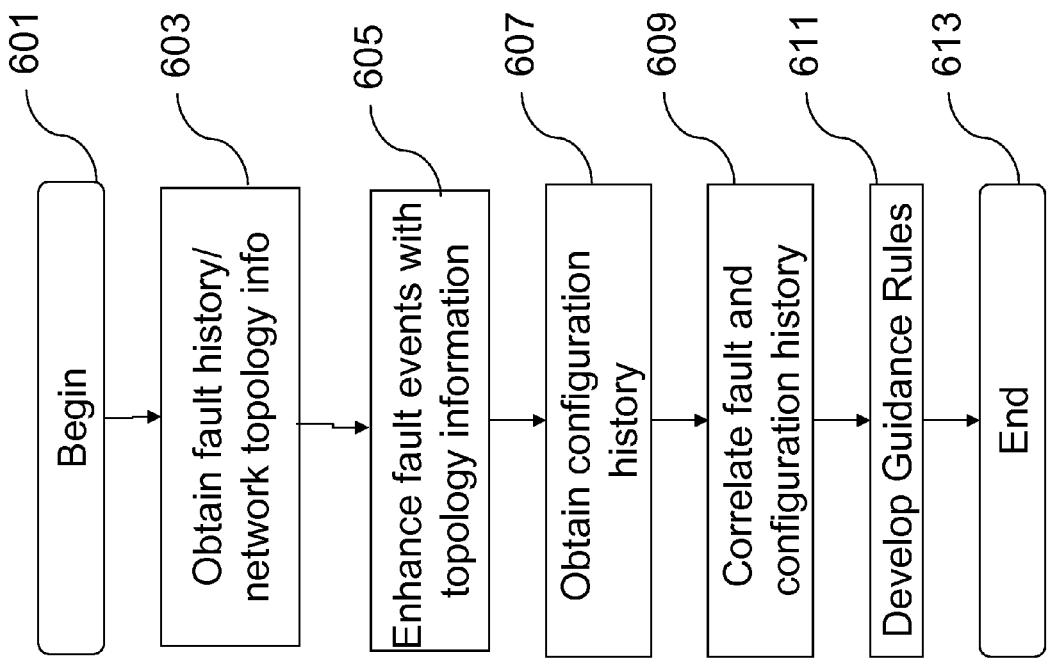
FIG. 6 is a flow diagram illustrating a process for developing operator guidance in accordance with an embodiment of this invention.

FIG. 6 depicts an example of an operator guidance system process in accordance with the present invention. The process can be triggered, in step 601, by different events or times, including but not limited to: a fault event being detected for a node in the Network 401; automatically at predetermined periodic time intervals; or as directed by an Administrator/operator. In step 603, the history of previous faults for a node is retrieved from the FD 405 and related network topology information for the node is retrieved from the Configuration Database 209. In step 605, the event fault information is enhanced using Event Enhancer 507, based on the topology of the network that generated the faults. As will also be described in an example with reference to an exemplary data structure (FIG. 8, 801) such enhanced event information could include network topology information such as: a list of nodes in the routing path of the reported fault; nodes that need to be used for services related to operation of the node; and/or nodes that are neighbors of the nodes in the routing path. This enhanced event information can be obtained for example by querying the network topology information stored in the CMDB (FIG. 2, 209). An example of a table of enhanced fault information in accordance with the present invention can be represented as follows:

| Time-Stamp | Reporting Node | Fault Node | Problem/Error Code | Adjacent Node to reporting node | Adjacent Node to Fault Node | Path Nodes |
| --- | --- | --- | --- | --- | --- | --- |
| 100 | S4 | S1 | Unreachable | A4 | A1 | A4, A1 |
| 200 | S4 | S1 | Normal | A4 | A1 | A4, A1 |
| 300 | S4 | S3 | Unreachable | A4 | A3 | A3, A4 |
| 400 | S4 | S3 | Normal | A4 | A3 | A3, A4 |
| 500 | S4 | S1 | Unreachable | A4 | A1 | A1, A4 |
| 600 | S4 | S1 | Normal | A4 | A1 | A1, A4 |
| 700 | S4 | S2 | Unreachable | A4 | A2 | A2, A4 |
| 800 | S4 | S2 | Normal | A4 | A2 | A2. A4 |

In step 607, a history of past configuration changes made to the node can be obtained from the Configuration Database 209. An example of the results of a query of the configuration database CMDB 209 for the time periods relevant to the faults could be represented as follows:

| TimeStamp | Node Reconfigured | Command |
| --- | --- | --- |
| 150 | A1 | Reboot |
| 350 | A3 | Reboot |
| 550 | A1 | Reboot |
| 750 | A2 | Reboot |

In step 609, the enhanced event information (from step 605) is correlated to configuration changes that were performed to correct similar past fault events (from step 607). In the above example, current data mining techniques would reveal that past configuration actions taken to correct a node that generates an "Unreachable" problem code is to reboot the node adjacent to the fault node. In step 611, the correlated information is used to develop guidance rules for the operators and administrators of the network system. The fault and configuration logs were shown in the above examples in a somewhat simplified way so as to not obscure features of the resent invention. Those skilled in the art will appreciate that in practice there may be multiple causes for an event and different corrective actions taken, so the guidance rules developed will be probabilistic. The process then terminates in step 613.

Figure 7:
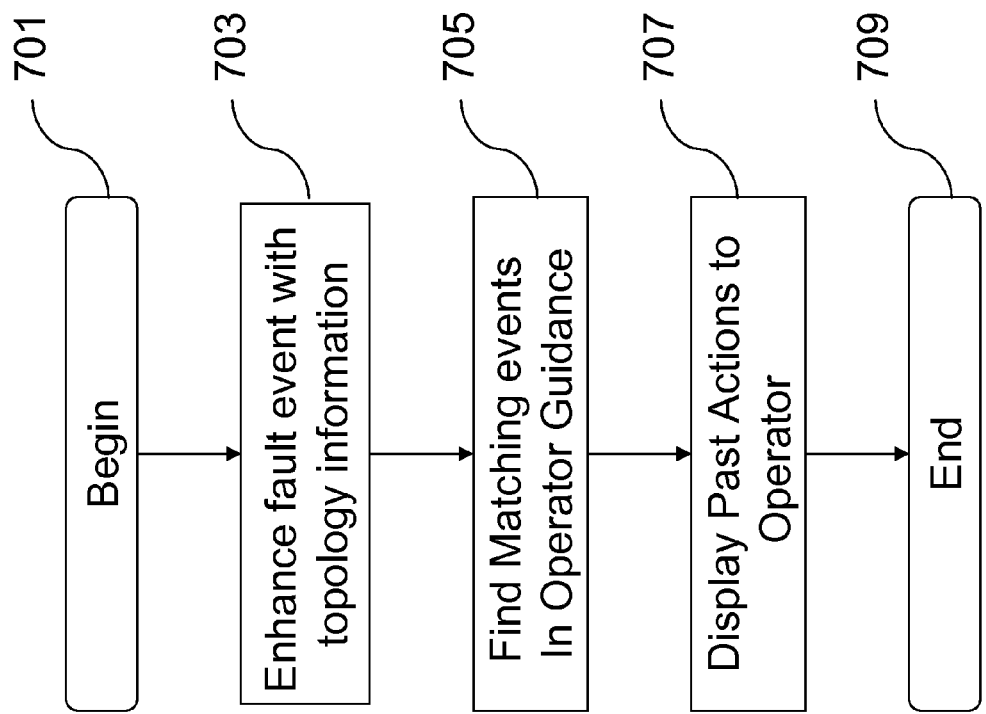
FIG. 7 is a flow diagram illustrating an example of a process for handling a network fault event in accordance with the present invention.

FIG. 7 is illustrates an example of a process for handling a fault in accordance with an embodiment of this invention. Recall that in FIG. 6 step 611, a set of operator guidance rules were developed to provide advice and recommendations to an operator when new network faults occur. As depicted in FIG. 7, the process begins in step 701, when a new fault event is observed by the OGS through its FMI (FIG. 5, 503) connection to the FMS (FIG. 4, 403) and/or FD 405. In step 703, the fault event is enhanced with information such as was described above with reference to FIG. 6, step 605. As was demonstrated in the previous example, since the configuration action necessary to correct a fault may need to be taken on a node that is not the same as the reporting node, fault events are enhanced certain related topology information so that a meaningful comparison can be done. In step 705, the enhanced event is compared with prior enhanced events to find one or more similar events and the corresponding configuration actions that were taken in response to the prior similar events. In step 707, as will be discussed in more detail with reference to FIG. 9, a summary of the similar past events and actions can be displayed to the administrator/operator to facilitate resolution of the current fault event. The process completes in step 709.

Figure 8:
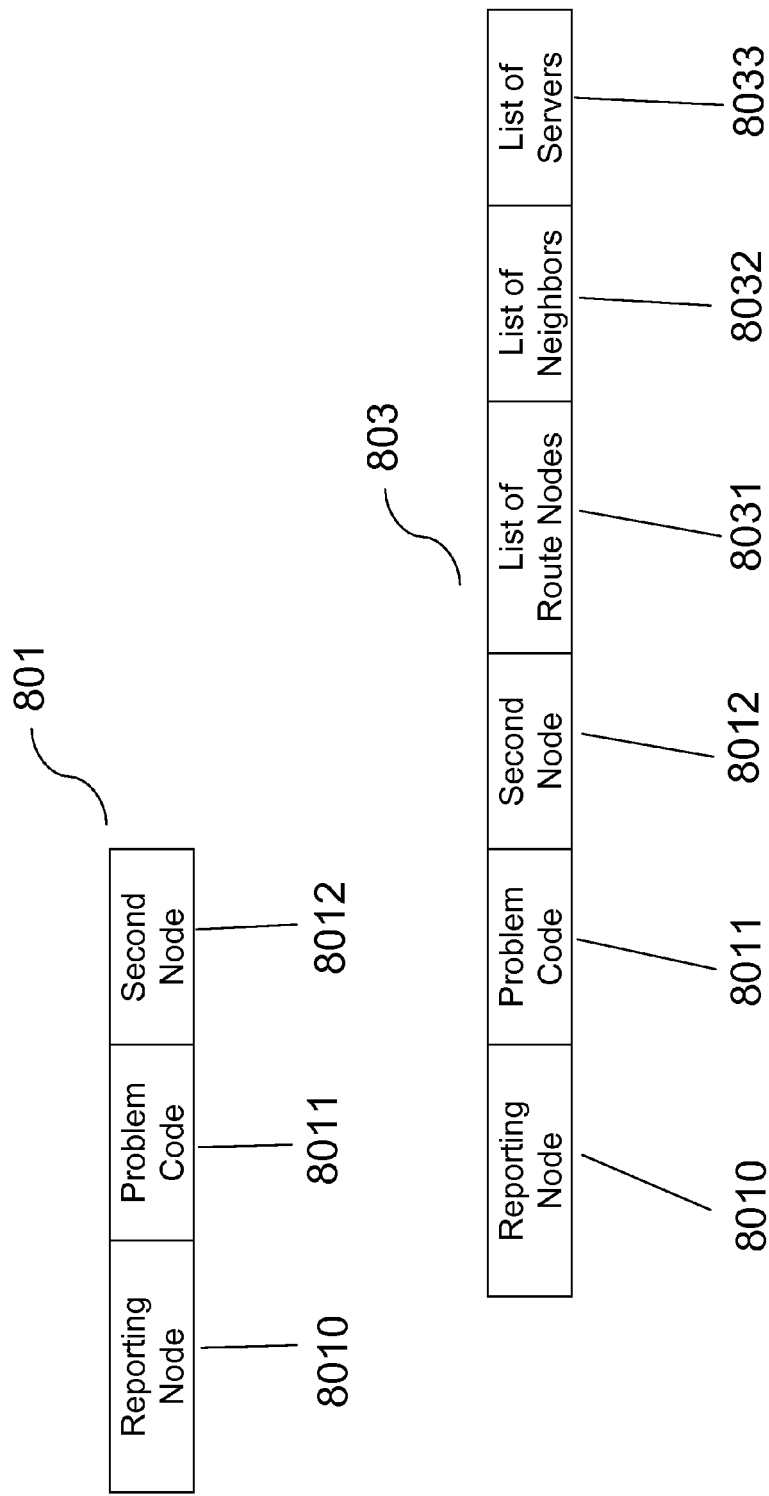
FIG. 8 depicts an example of a fault event data structure and an enhanced fault event data structure in accordance with the present invention.

FIG. 8 depicts an example of a data structure of a typical fault event before 801 and after enhancement 803 in accordance with the present invention. Before enhancement, a typical fault event data structure 801 could contain information such as: the identity of the reporting node; the node that reported the fault event (reporting node 8010); a fault type (problem code 8011); and depending on the problem code, some other attributes of the fault. For example, the fault event 801 may also include the identity of a second node 8012, e.g. the fault may indicate that the reporting node was not able to communicate with a referenced second node, or that an error was generated when trying to identify the second node. An exemplary enhanced event structure 803 includes correlated fault and configuration information in accordance with the present invention. As depicted, in addition to the information contained in event fault data structure 801, the enhanced event structure 803 can include other computed information such as: a list of nodes in the route/path 8031 between the two nodes involved in the original fault event; information about some or all of the neighbors 8032 of the nodes involved in the from the original fault event; and a list of servers 8033 that provide predefined services to other nodes, e.g. each node may have a domain name server (DNS), or a dynamic host configuration protocol (DHCP) server that provides it with name resolution services, or configuration parameter services. There are many such services provided in the normal course of operation of the network. One or more such providers of services 8033 of the reporting node 8010 may be included in the enhanced event data structure 803.

As was discussed above for example with reference to FIG. 6, step 609, after the enhancement of the event, information correlation and data mining techniques can be used to correlate subsequent faults and suggest configuration activities that may correct the fault. This correlation can be applied to the operator guidance systems using known correlation techniques, and used to develop advisory guides for the operator.

Figure 9:
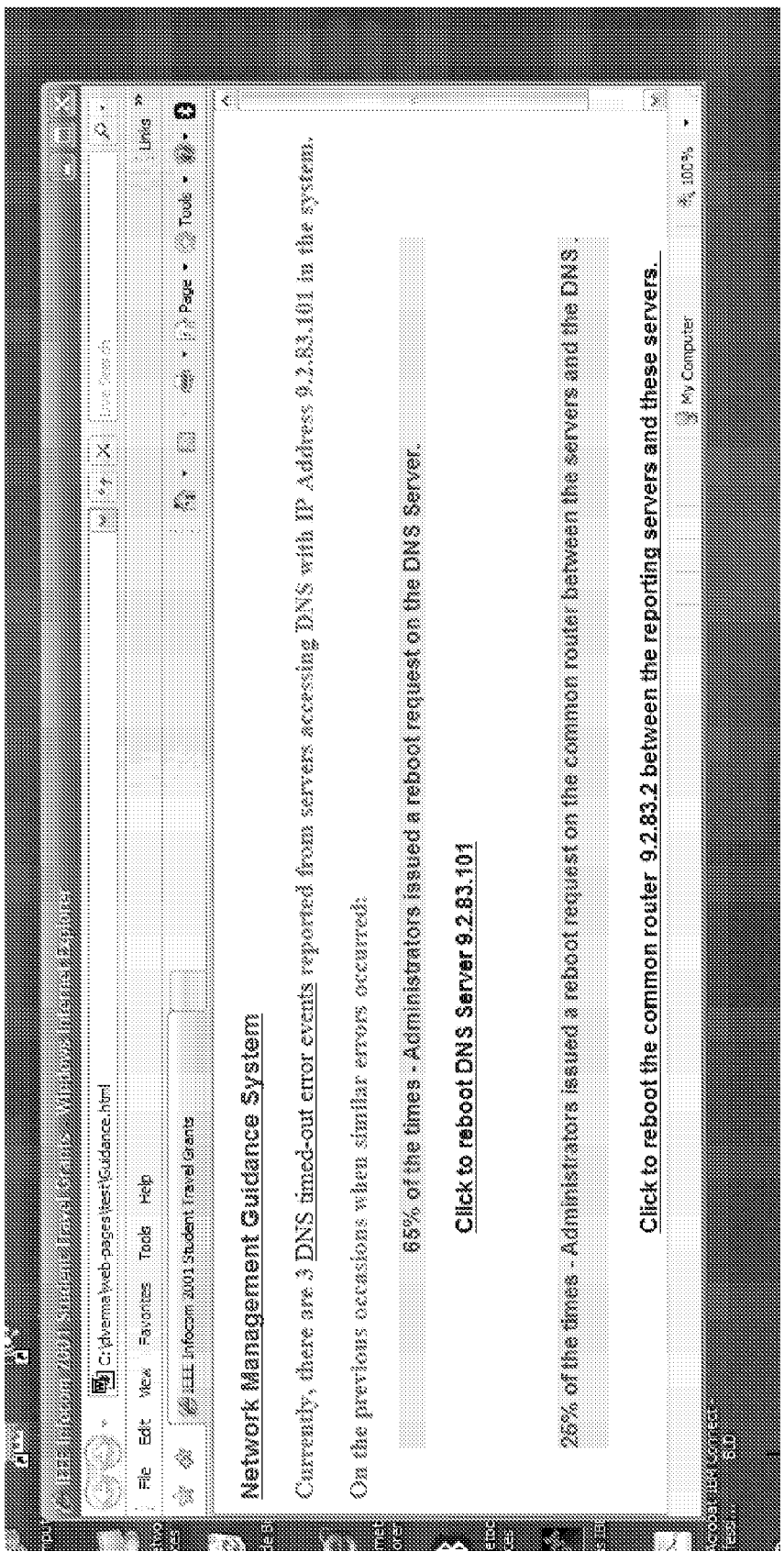
FIG. 9 depicts an example of an advisory panel display in accordance with the present invention.

FIG. 9 depicts an example of an advisory panel providing information about actions taken previously to handle a similar event, and providing guidance to an operator as to appropriate configuration actions to fix the fault. As depicted, in response to a network fault event received from a need reporting a time out when trying to access a DNS, a guidance system in accordance with the present invention displays to the operator possible configuration activities that may correct the fault. One way to display information in the advisory panel is to show them according to the frequency in which each action was used in the past configuration change information. If action A1 was taken 40% of the time, action A2 was taken 30% of the time, and action A3 was taken 20% of the times, then the operator guidance may be shown in the order of suggesting action A1, followed by action A2, and then by suggestion by action A3. Other embodiments may include alternative approaches for ordering the rules, such as policies based on other statistical measures, or prior knowledge encoded by a domain expert.

In addition to providing guidance to the operator, in some embodiments, the system can be modified so that some of the faults in the network are automatically corrected. For example, a set of policies can be defined governing when one or more corrective actions can be taken automatically, and when the corrective action requires the involvement of a human administrator. By way of example only, a policy can be defined as a Boolean combination of conditions under which the corrective action can be taken automatically, e.g., if the operator guidance system shows that more than 80% of the time (or some other appropriate predetermined threshold), a specific action is used to successfully correct a fault, then the policy can state that the action can be applied automatically. Another set of policies may, for example, use a different threshold using the night-time hours.

Figure 10:
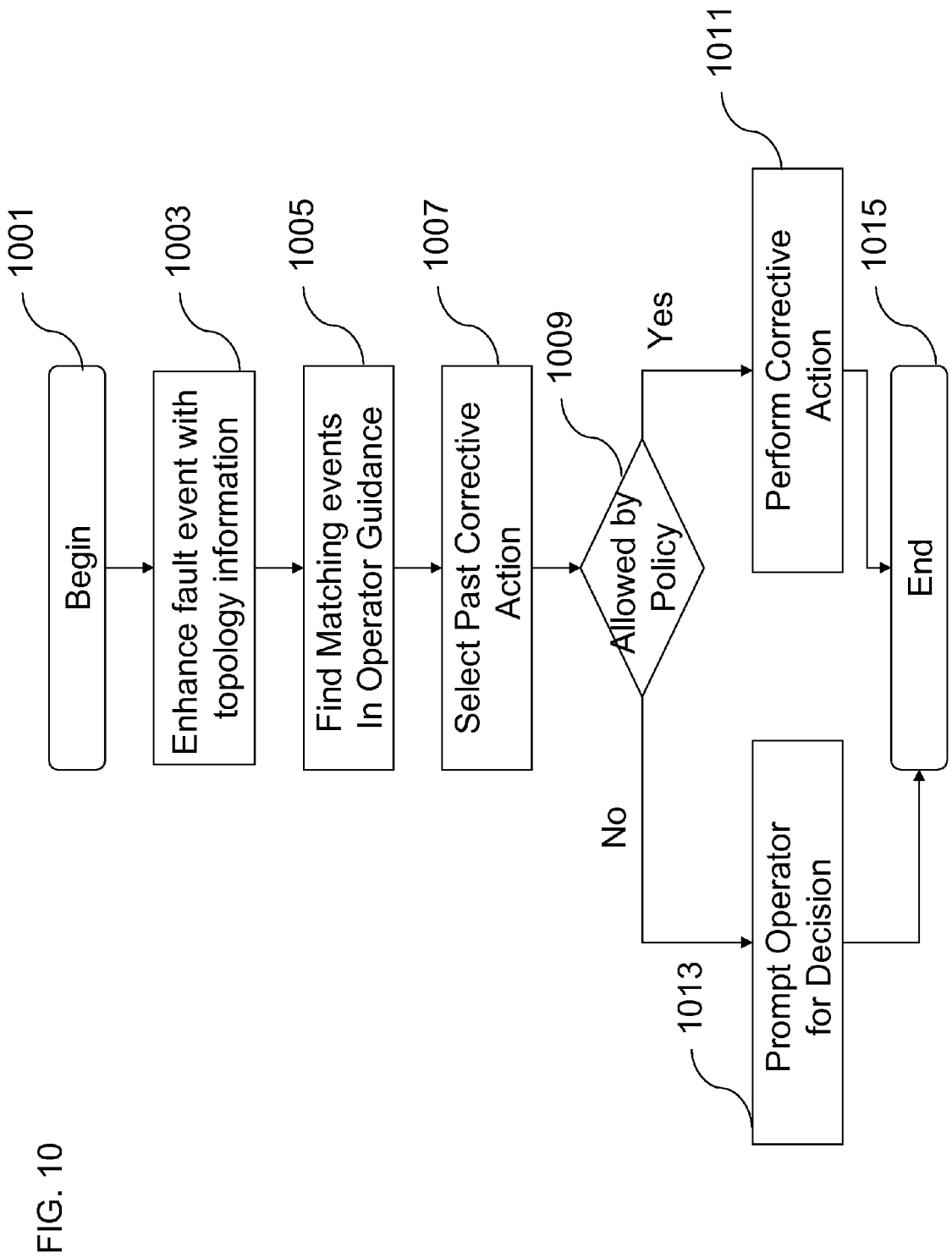
FIG. 10 depicts an example of a policy-enabled operator guidance system in accordance with the present invention.

FIG. 10 depicts an example of a policy enabled operator guidance system for automatically correcting network faults. The initial step 1001 is entered when a new fault event is observed from the fault management system. In step 1003, the event is enhanced with information such as was described above. In step 1005, the enhanced event is used to identify a class of similar events and the configuration actions that were taken in response to those events. In step 1007, in some embodiments, the most common corrective action taken in the past is selected. In step 1009, the process may check if automatic corrective action is allowed under the policies defined for the corresponding computer network or distributed computer system. If the outcome of step 1009 shows that automatic corrective action is allowed, the system automatically performs the corrective action in step 1011, and then terminates in step 1015. Otherwise, the process notifies the administrator to take one or more corrective actions, in step 1013 and the process terminates, in step 1015.

Figure 11:
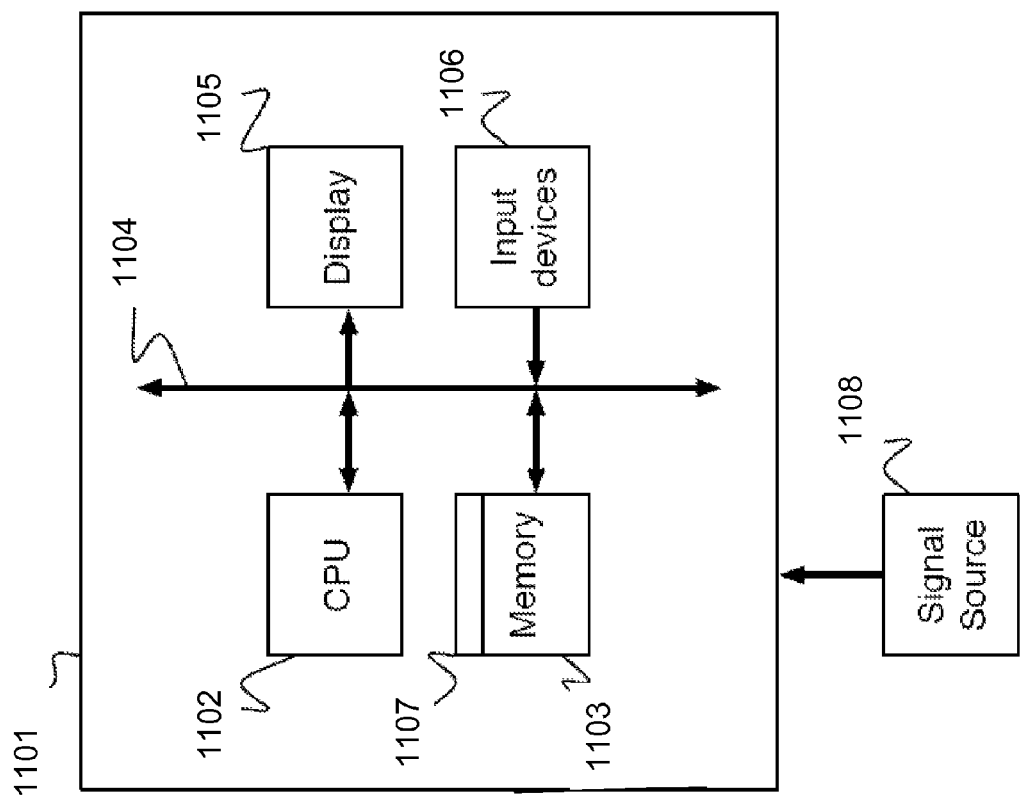
FIG. 11 depicts an example of a computer system adapted to comprise an operator guidance system in accordance with the present invention.

Those skilled in the art will appreciate that one or more embodiments of the invention can be implemented in the form of a computer product including a computer usable medium with computer usable program code implementing the inventive process; and that one or more embodiments or aspects of the invention can be implemented in the form of a computer system including at least one processor that is coupled to a memory storing computer usable program code operative to perform exemplary process steps. For example, FIG. 11 depicts an example of a computer system 1101 that may be adapted to comprise an operator guidance system in accordance with the present invention, comprising, inter alia, a central processing unit (CPU) 1102, a memory 1103 and an input/output (I/O) interface 1104. The computer system 1101 is generally coupled through the I/O interface 1104 to a display 1105 and various input devices 1106 such as a mouse and keyboard. The support circuits can include circuits such as cache, power supplies, clock circuits, and a communications bus. The memory 1103 can include random access memory (RAM), read only memory (ROM), disk drive, optical drive, tape drive, etc., or a combination thereof. The operator guidance system of the present invention can be implemented as a routine 1107 that is stored in memory 1103 and executed by the CPU 1102 to process the signal from the signal source 1108. As such, the computer system 1101 is a general purpose computer system that becomes a specific purpose computer system when executing the operator guidance system routine 1107 of the present disclosure. The computer system 1101 also typically includes an operating system and micro instruction code. The various processes and functions described herein may either be part of the micro instruction code or part of an application or middleware program (or a combination thereof) which is executed using the operating system. In addition, various other peripheral devices may be connected to the computer platform such as an additional data storage devices and printing devices.

It is to be further understood that, because some of the constituent system components and method steps depicted in the accompanying figures may be implemented in software, the actual connections between the system components (or the process steps) may differ depending upon the manner in which the system is programmed. Given the teachings of the present disclosure provided herein, one of ordinary skill in the related art will be able to contemplate these and similar implementations or configurations of the present disclosure.

Now that illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention, which is properly defined by the claims appended hereto.

What is claimed is:

1. A method for managing a network, comprising the steps of:
retrieving network fault event information for a target node;
retrieving network topology information for the target node and enhancing the network fault event information with the network topology information;
retrieving past network configuration change information comprising changes made to the target node to correct past fault events based on enhanced network fault event information;
correlating the enhanced network fault event information with configuration changes that were performed to correct similar past fault events from the past network configuration change information for the target node;
creating and storing a set of network operation guidance rules based on correlated past network configuration change information, wherein said guidance rules include a set of policies for governing when a corrective action may be taken automatically; and displaying said configuration changes according to a frequency in which each configuration change was used in the past network configuration change information to correct similar past fault events.

2. The method of claim 1, further comprising:
receiving a network fault event, wherein said step of retrieving a network fault event history for a target node, is in response to said receiving step.

3. The method of claim 1, further comprising:
reconfiguring a network node based on correlated past network configuration change information.

4. The method of claim 1, further comprising:
ordering the set of network operation guidance rules based on a frequency of occurrence of each configuration change previously performed.

5. The method of claim 1, wherein said reconfiguring a network node based on the correlated past network configuration change information, further comprises:
automatically reconfiguring the network node based on the set of network operation guidance rules.

6. The method of claim 1, wherein said step of retrieving network topology information for the target node that enhances the network fault event information, further comprises:
incorporating information on path nodes in a routing path of one or more nodes identified in the network fault event.

7. The method of claim 1, wherein said step of retrieving network topology information for the target node that enhances the network fault event information further comprises:
incorporating information on one or more adjacent nodes to one or more nodes identified in the network fault event.

8. The method of claim 1, wherein said step of retrieving network topology information for the target node that enhances the network fault event information further comprises:
incorporating information on one or more nodes that perform a service function for one or more nodes identified in the network fault event.

9. A method for managing a network, comprising the steps of:
creating one or more enhanced network fault event data structures comprising: at least one network node; a problem code; an adjacent node to said network node; and one or more path nodes in a routing path of said network node;
correlating the enhanced network fault event data to past network configuration change information comprising changes made to the target node to correct similar past fault events; and
creating and storing a set of network management guidance rules based on the correlated network fault event data and past network configuration change information, wherein said guidance rules include a set of policies for governing when a corrective action may be taken automatically; and
displaying said configuration changes according to a frequency in which each configuration change was used in the past network configuration change information to correct similar past fault events.

10. The method of claim 9, further comprising:
receiving a network fault event for a network node; and
taking corrective action to resolve the network fault event, based on the network management guidance rules.

11. The method of claim 9, wherein the enhanced network fault event data structures further comprises information on one or more nodes that perform a service function for one or more nodes identified in the network fault event.

12. A system for managing a network, comprising the steps of:
fault management interface means for retrieving network fault event information for a target node;
configuration information interface means for retrieving network topology information for the target node;
event enhancer means for enhancing the network fault event information with network topology information for the target node;
information correlation means for retrieving past network configuration change information comprising changes made to the target mode to correct past fault events based on enhanced network fault event information and correlating the enhanced network fault event information with configuration changes that were performed to correct similar past fault events from the past network configuration change information for the target node; a guidance builder means for creating and storing a set of network management guidance rules based on the correlated network fault event data and past network configuration change information and for displaying said configuration changes according to a frequency in which each configuration change was used in the past network configuration change information to correct similar past fault events, wherein said guidance rules include a set of policies for governing when a corrective action may be taken automatically.

13. The system of claim 12, wherein said fault management interface means further comprises means for receiving a network fault event and retrieving the network fault event history for a target node in response to receiving the network fault event.

14. The system of claim 12, further comprising means for reconfiguring a network node based on correlated past network configuration change information.

15. The system of claim 14, wherein the guidance builder means creates and stores an ordered set of network operation guidance rules based on correlated past network configuration change information, wherein the set of network operation guidance rules are ordered based on a frequency of occurrence of each configuration change previously performed.

16. The system of claim 15, wherein said means for reconfiguring a network node based on the correlated past network configuration change information is coupled to said guidance builder means and said configuration information means and is adapted for automatically reconfiguring the network node based on the set of network operation guidance rules.

17. The system of claim 15, wherein said step of retrieving network topology information for the target node that enhances the network fault event information, further comprises incorporating information on path nodes in a routing path of one or more nodes identified in the network fault event.

18. The system of claim 15, wherein said event enhancer means for retrieving network topology information for the target node further comprises:
means for enhancing the network fault event information with information on at least one of: an adjacent node to a node identified in the network fault event; and a service node adapted for performing a service a node identified in the network fault event.

19. A computer program product comprising a computer useable device having computer useable program code for managing a computer network, said computer program product including computer useable program code to perform the steps of:
retrieving network fault event information for a target node;
retrieving network topology information for the target node that enhances the network fault event information;
retrieving past network configuration change information comprising changes made to the target mode to correct past fault events based on enhanced network fault event information;

correlating the enhanced network fault event information with configuration changes that were performed to correct similar past fault events from the past network configuration change information for the target node; and creating and storing a set of network operation guidance rules based on correlated past network configuration change information, wherein said guidance rules include a set of policies for governing when a corrective action may be taken automatically; and displaying said configuration changes according to a frequency in which each configuration change was used in the past network configuration change information to correct similar past fault events.

* * * * *